United States Patent
Sandstrom

(10) Patent No.: US 7,474,948 B2
(45) Date of Patent: Jan. 6, 2009

(54) CONCEPT FOR USING SOFTWARE/ELECTRONICS TO CALIBRATE THE CONTROL SYSTEM FOR AN AUTOMATIC TRANSMISSION

(75) Inventor: Eric Sandstrom, Oxford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 691 days.

(21) Appl. No.: 10/789,540

(22) Filed: Feb. 27, 2004

(65) Prior Publication Data
US 2004/0230359 A1 Nov. 18, 2004

Related U.S. Application Data

(60) Provisional application No. 60/462,225, filed on Apr. 11, 2003.

(51) Int. Cl.
G06F 7/00 (2006.01)
(52) U.S. Cl. .................................................. 701/51
(58) Field of Classification Search .................. 701/55, 701/51
See application file for complete search history.

(56) References Cited

U.S. PATENT DOCUMENTS

| 5,487,003 A | * | 1/1996 | Iwasawa et al. ............... 701/51 |
| 5,518,468 A | | 5/1996 | Sametz |
| 5,782,711 A | * | 7/1998 | Tsutsui et al. ................ 477/156 |
| 6,070,485 A | * | 6/2000 | Funk et al. ............... 74/473.12 |
| 6,449,547 B1 | * | 9/2002 | Kurihara ....................... 701/56 |
| 6,679,800 B1 | * | 1/2004 | Ishii et al. ................... 475/116 |
| 6,751,542 B2 | * | 6/2004 | Ishii et al. ..................... 701/51 |
| 6,865,499 B2 | * | 3/2005 | Yutkowitz ................... 702/105 |
| 7,231,317 B2 | * | 6/2007 | Todd et al. .................. 702/183 |
| 2001/0037970 A1 | * | 11/2001 | Boger et al. ................. 73/1.72 |
| 2002/0029136 A1 | * | 3/2002 | Hagiwara et al. .............. 703/8 |

FOREIGN PATENT DOCUMENTS

| EP | 0269658 | 12/1988 |
| EP | 1150031 | 10/2001 |
| EP | 1199499 | 4/2002 |
| WO | WO 93/11369 | 6/1993 |

* cited by examiner

Primary Examiner—Khoi H. Tran
Assistant Examiner—Nicholas Kiswanto
(74) Attorney, Agent, or Firm—Warn Partners, P.C.

(57) ABSTRACT

A software calibration strategy for calibrating solenoid controlled valves and valve systems in an automatic transmission. The strategy includes identifying a characteristic equation for the valve or valve system that is a mathematical relationship between a current applied to the solenoid and the pressure at the output of the valve or valve system. The valve or valve system is coupled to a test stand that depicts the operation of the valve or valve system in the transmission. Current signals are applied to the valve or valve system, and the output pressures are measured to determine coefficients in the equation using a curve fitting function. The coefficients are then stored in a control unit.

12 Claims, 2 Drawing Sheets

CONCEPT FOR USING SOFTWARE/ELECTRONICS TO CALIBRATE THE CONTROL SYSTEM FOR AN AUTOMATIC TRANSMISSION

CROSS REFERENCE TO RELATED APPLICATIONS

This application claims the benefit of the filing date of U.S. Provisional Application Ser. No. 60/462,225, titled Concept for using Software/Electronics to Calibrate the Control System for an Automatic Transmission, filed Apr. 11, 2003.

BACKGROUND OF THE INVENTION

1. Field of the Invention

This invention relates generally to a software calibration strategy for an electrohydraulic transmission control system and, more particularly, to a software calibration strategy for calibrating solenoids, solenoid controlled valve bodies, or solenoid controlled valve bodies with integrated control units that are used to control an automatic transmission for a vehicle.

2. Discussion of the Related Art

Automatic vehicle transmissions employ a plurality of gears, synchronizers, brake bands and clutches that are electronically controlled to automatically shift the gears of the vehicle. Typically, solenoid controlled valves are employed within the transmission to provide hydraulic pressure to control the operation of the various components and systems therein, such as clutches, brake bands, lubricant flow, hydraulic pressure, etc. The valves are generally proportional valves in that the amount of current applied to the solenoid of the valve determines the hydraulic pressure at the control output of the valve.

A solenoid controlled valve includes a coil wound around an armature and a valve body. The solenoid and the valve body can be attached or separate. The valve body is coupled to a hydraulic input line, a hydraulic exhaust line and a hydraulic control output line. Hydraulic supply pressure is applied to the input line. The supply pressure applied to the valve is stable, and the control pressure on the output line of the valve is set by the position of the armature. When no current is applied to the coil, the control output line is coupled directly to the exhaust line so that no output pressure is applied to the control line. When current is applied to the solenoid, the armature moves so that the hydraulic supply pressure is directed to the control line. The amount of current applied to the coil sets the force on the armature, and thus its ability to maintain its regulated output pressure. The valve is regulating in that if the load on the control line changes, the armature moves in response thereto to provide the same output pressure for that current.

Proportional solenoid controlled valves need to be calibrated so that they provide the desired control pressure relative to the input current. If the control valves in the transmission are not properly calibrated, then the performance of the transmission is reduced by a variety of factors, such as lower fuel economy, hard shifts, etc. Typically, the valve is calibrated by mechanical devices when the valve is manufactured. One known mechanical device is a threaded mechanism that increases or decreases a spring force applied to the armature. A second mechanical technique for calibrating a solenoid or solenoid piloted valve is to selectively adjust the working air gap between the armature and pole piece of the solenoid, which adjusts the magnetic force level of the device.

The known mechanical techniques of calibrating a solenoid valve are typically costly because the calibration components are expensive to manufacture and the calibration process is time consuming. Further, the equipment required to perform the calibration is expensive and has inherent accuracy limitations. Additionally, the solenoid or solenoid piloted valve is not calibrated to other system components, such as electronics, other valves, leakage, etc, that may affect the valve performance when it is employed in the system.

SUMMARY OF THE INVENTION

In accordance with the teachings of the present invention, a software calibration strategy is disclosed that has particular application for calibrating solenoid controlled valves and electrohydraulic control systems employed in an automatic transmission. The calibration strategy includes identifying a characteristic equation that is unique for a particular class of valves or valve systems, and identifies a mathematical relationship between the current applied to the solenoid and the pressure, or other force such as fluid flow, at the output of the valve or valve system. The characteristic equation will include several coefficients that are unique for each separate valve or valve system in the class.

The valve or valve system is coupled to a test stand that simulates the operation of the valve or valve system in the transmission. Control current signals are applied to a solenoid in the valve or valve system and the output pressure (or flow) of the valve or valve system is measured. Once the current and corresponding pressure is known for several points, the coefficients for the particular valve or valve system can be determined by using a curve fitting technique, such as a least squares regression, on the characteristic equation. Once the coefficients are identified, they are stored in a flash memory of a transmission control unit (TCU) that is typically integrated into a transmission control module. The coefficients are then used in combination with the characteristic equation, which is part of the vehicle software stored in a TCU memory, to create a unique, high precision, continuous mathematical representation of the valve or valve system performance characteristic.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a software calibration strategy for an automatic transmission is merely exemplary in nature, and is in no way intended to limit the invention or its applications or uses.

Figure 1:
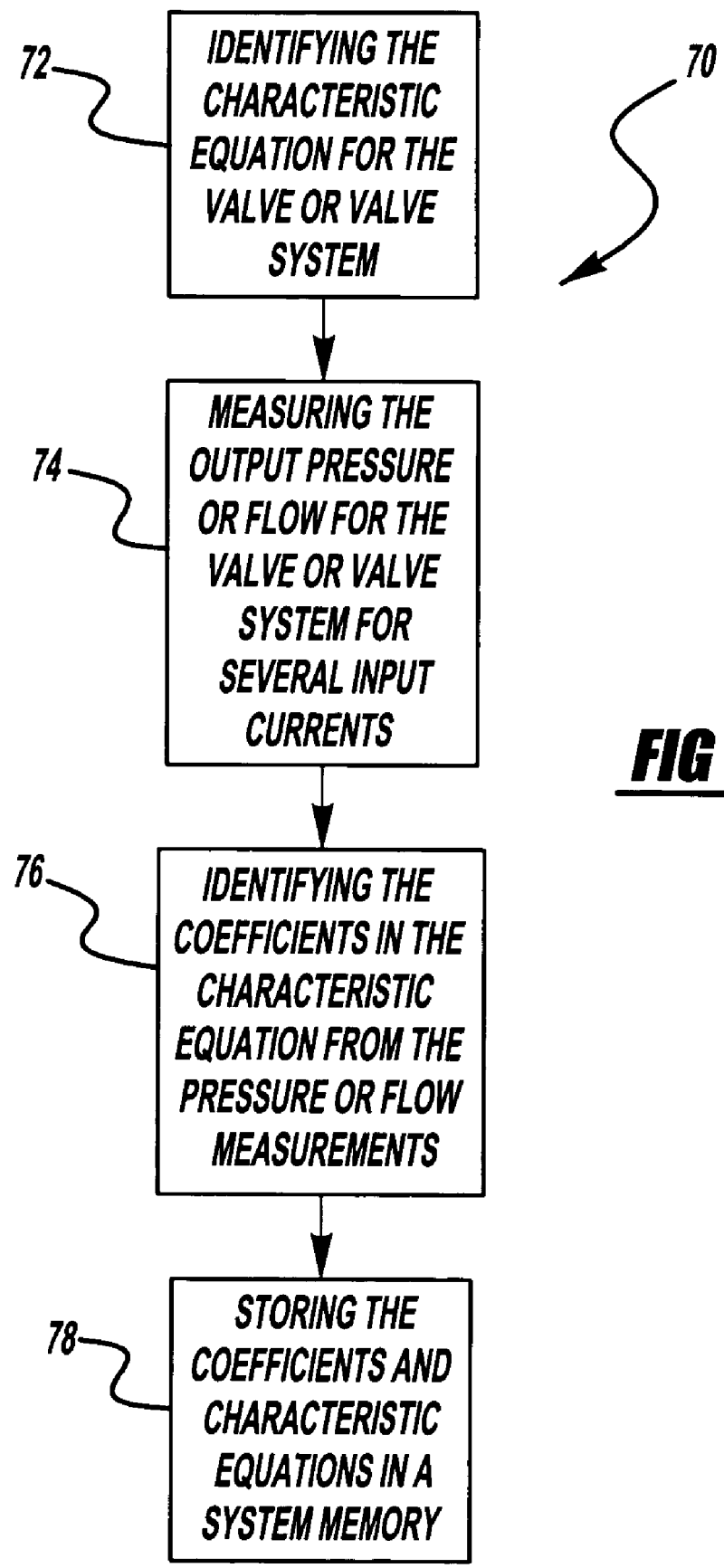
FIG. 1 is a flow chart diagram showing a process of calibrating valve and/or valve systems, according to an embodiment of the present invention.

FIG. 1 is a block diagram 70 showing a process for calibrating valve systems and valves in an automatic transmission, according to the invention. The calibration strategy of the invention employs a test stand that simulates the operation of the transmission. An algorithm is employed to simulate the operation of the transmission to determine the actual pressures or flows at certain operating conditions.

Each class of valve and/or valve system can be represented by a characteristic equation, the complexity of which is a function of the desired accuracy of the fitting function and the degree of non-linearity and number of inflection points of the actual performance characteristic. The general form of the equation is required input=function (desired output), where the desired output is pressure, flow, etc. and the required input is solenoid current.

The characteristic equation for each valve or valve system is part of the transmission control software code, which resides in a TCU memory. This equation does not change from part to part. A typical characteristic equation for a proportional control solenoid is provided in equation (1). Unique coefficients for the characteristic equation, identified as $C_1$, $C_2$, $C_3$, $C_4$ and $C_5$ for the characteristic equation in (1), are created by using a curve fitting technique, for example least-squares regression, using actual measured data obtained during the final test of the valve and/or valve system as an input to the fitting algorithm.

$$i(P) = C_1 + \frac{C_2}{1+P} + C_3 \cdot P + C_4 \cdot P^2 + \frac{C_5}{P^3 + 0.0001} \quad (1)$$

The coefficients are flashed to the TCU memory at the end of the final production test procedure, resulting in a unique equation describing the performance characteristic of the valve and/or valve system. It is important to note that because the calibration is performed on the complete system, rather than on the individual components, the overall system variation due to downstream/upstream valve geometry, spring loads, leakage, solenoids, electronics, etc. is significantly reduced.

Figure 2:
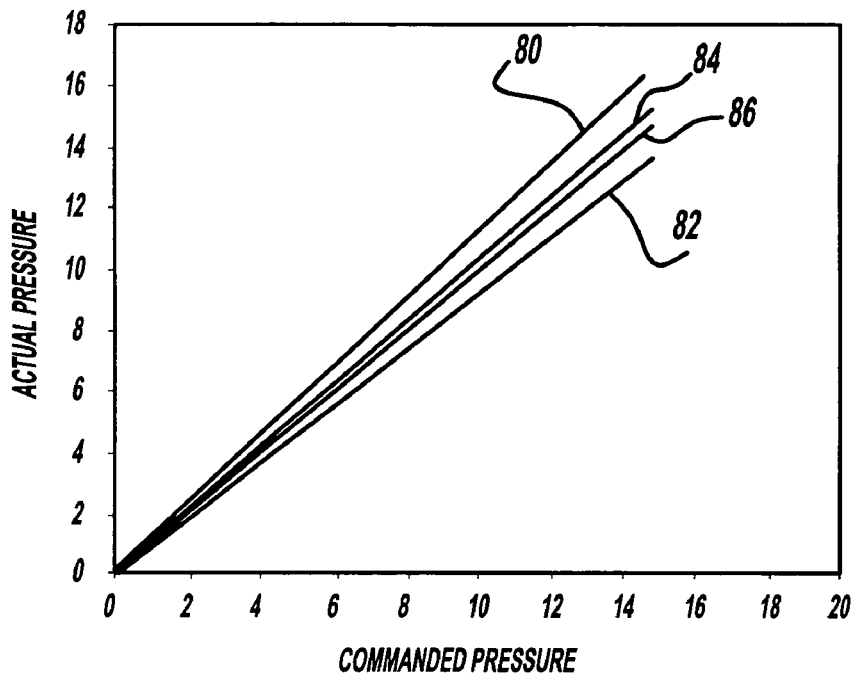
FIG. 2 is a graph with commanded pressure on the horizontal axis and actual pressure on the vertical axis showing the pre/post calibration relationship between the actual measured pressure and the commanded or desired pressure for a large population of proportional pressure control devices.

FIG. 2 shows pre and post calibration results obtained from a large population of proportional pressure control devices in a known pressure control system. Upper and lower bounds are shown for the population based on a +/−5 sigma normal distribution. The graph lines 80 and 82 represent a +/−5 sigma distribution before the calibration, and the graph lines 84 and 86 represent a +/−5 sigma distribution after the calibration.

The first step of the process at box 72 includes identifying the characteristic equation for a particular valve or valve system, which becomes part of the transmission control software and resides in TCU memory. The next step of the process at box 74 includes measuring the output pressure or flow of the valve or valve system for a series of input currents applied to the solenoids discussed above. The number of test currents required depends on the number of variables in the characteristic equation and the degree of non-linearity and number of inflection points in the characteristic equation, and the desired accuracy of the fit. In a typical embodiment, the number of test currents may be in the range of 5-8 test currents.

The next step of the process includes determining the coefficients as represented by box 76. In one embodiment, the coefficients are determined by a regression technique, for example, a least-squares method, that calculates the coefficients for the characteristic equation that result in a best fit to the measured data obtained in the previous step at the box 74. The result is a unique, continuous mathematical relationship between the current applied to the solenoid and the pressure (or flow, position, etc.) at the output of the electrohydraulic system.

Equation (2) below shows a typical characteristic equation, with calculated coefficients, for a proportional pressure control system. Once the coefficients are determined by the least-square fitting function or otherwise, the coefficients are stored in a flash memory of the electrohydraulic system, as represented by box 78. The characteristic equation resides in the TCU memory and is imbedded in the transmission control software. Note that the characteristic equation need not be flashed at this time because it is not unique to each part within a given class. Only the coefficients are unique.

$$i(P) = 0.376 - \frac{.242}{1+P} + 0.059 \cdot P + 1.681 \cdot 10^{-5} \cdot P^2 - \frac{7.328 \cdot 10^{-9}}{P^3 + 0.0001} \quad (2)$$

Figure 3:
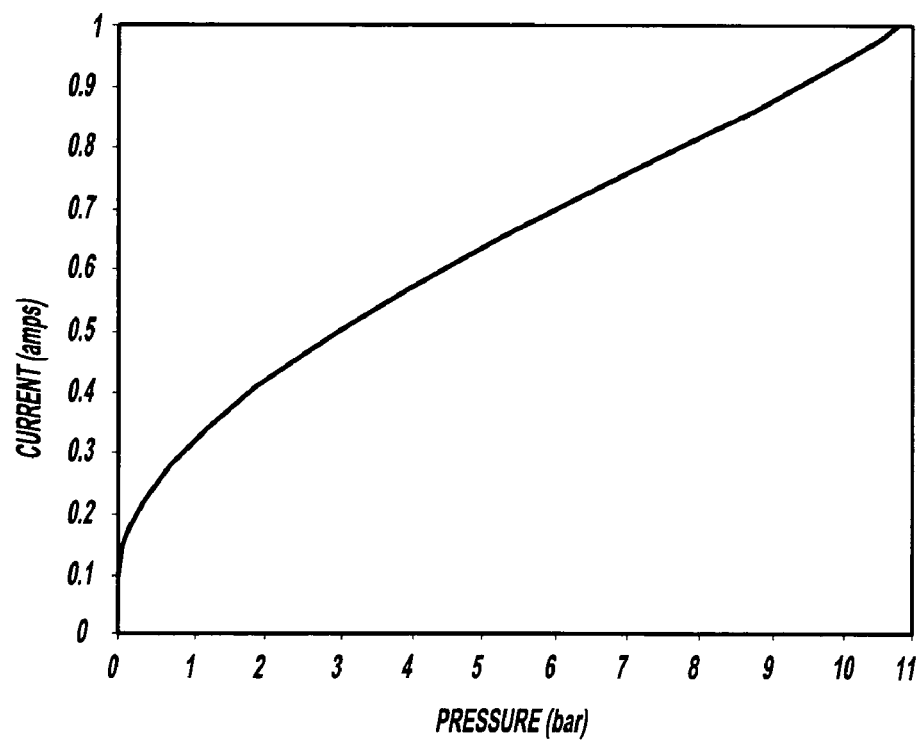
FIG. 3 is a graph with current on the vertical axis and pressure on the horizontal axis showing the relationship between current and hydraulic pressure for a clutch pressure control valve in an automatic transmission.

FIG. 3 is a graph with current on the vertical axis and pressure on the horizontal axis showing the general current to pressure relationship for the characteristic equation (1).

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method of calibrating an unique proportional solenoid of an unique member of a predesigned class of electrohydraulic control systems that is inclusive of at least one valve controlled by a proportional solenoid that provides an output response in response to an input current, said method comprising:

identifying a characteristic equation of the proportional solenoid in the electrohydraulic system, said characteristic equation including a plurality of coefficients;

imbedding into a control unit for said electrohydraulic control system characteristic equation the;

coupling the electrohydraulic system to a test stand;

applying a plurality of currents to the unique solenoid of the electrohydraulic system;

measuring the output response of the unique electrohydraulic system for each of the plurality of currents;

identifying unique coefficients in the characteristic equation from the output response measurements; and flashing the coefficients in a memory of the control unit.

2. The method according to claim 1 wherein identifying the coefficients in the characteristic equation from the output response measurements includes employing a curve fitting function.

3. The method according to claim 2 wherein identifying the coefficients in the characteristic equation from the output response measurements includes employing a least squares fitting function.

4. The method according to claim 1 further comprising hard-coding the characteristic equation into control software.

5. The method according to claim 1 wherein the electrohydraulic system is employed in an automatic transmission.

6. The method according to claim 5 wherein the electrohydraulic system is employed in a pressure regulation system or a flow regulation system used for controlling functions in the automatic transmission.

7. The method according to claim 1 wherein the electrohydraulic system includes an integrated transmission control unit (TCU).

8. The method according to claim 1 wherein the output response is selected from the group consisting of pressure and fluid flow.

9. A method of calibrating an unique proportional solenoid of an unique member of a predesigned class of electrohydraulic systems employed in automatic transmissions, said electrohydraulic system providing an output response in response to an input current, wherein the electrohydraulic system includes a proportional solenoid, a hydraulic valve, and solenoid drive electronics, said method comprising:

identifying a characteristic equation of the electrohydraulic system, said characteristic equation including a plurality of coefficients;

imbedding the characteristic equation into a control unit for the transmission;

coupling the electrohydraulic system to a test stand;

applying a plurality of currents to the solenoid controlling the valve;

measuring the output response of the electrohydraulic system for each current;

identifying the unique coefficients of the characteristic equation from the output response measurements, wherein identifying the coefficients in the characteristic equation from the output response measurements includes employing a curve fitting function; and storing the coefficients in an on-board memory of the control unit.

10. The method according to claim 9 wherein the electrohydraulic system is employed in a pressure regulation system or a flow regulation system used for controlling functions in the automatic transmission.

11. The method according to claim 9 wherein identifying the coefficients in the characteristic equation from the output response measurements includes employing a least squares fitting function.

12. The method according to claim 9 wherein the output response is selected from the group consisting of pressure and fluid flow.

* * * * *